United States Patent [19]
Toth

[11] Patent Number: 6,018,529
[45] Date of Patent: Jan. 25, 2000

[54] CHANNEL BANK WITH INDIVIDUALLY REMOVABLE PROCESSORLESS U-BRITE CARDS CONTROLLED BY BANK CONTROLLER CARD

[75] Inventor: Robert James Toth, Huntsville, Ala.

[73] Assignee: Adtran, Inc., Huntsville, Ala.

[21] Appl. No.: 08/722,367

[22] Filed: Sep. 27, 1996

[51] Int. Cl.[7] .............................. H04L 12/66; H04J 3/12
[52] U.S. Cl. ..................... 370/463; 370/524; 379/399
[58] Field of Search ..................... 370/419, 420, 370/421, 463, 522, 458, 904, 524, 535, 537, 449, 450, 451, 359; 379/230, 333, 334, 399

[56] References Cited

U.S. PATENT DOCUMENTS

| | | | |
|---|---|---|---|
| 5,105,421 | 4/1992 | Gingell | 370/458 |
| 5,347,566 | 9/1994 | Law et al. | 379/333 |
| 5,636,202 | 6/1997 | Grney | 370/241 |
| 5,682,385 | 10/1997 | Garcia et al. | 370/458 |
| 5,719,870 | 2/1998 | Baker et al. | 370/463 |
| 5,740,169 | 4/1998 | Eames | 370/362 |

*Primary Examiner*—Douglas W. Olms
*Assistant Examiner*—Seema S. Rao
*Attorney, Agent, or Firm*—Charles E. Wands

[57] ABSTRACT

A reduced cost and hardware complexity ISDN channel bank architecture supports a plurality of Basic Rate-One Transmission Extension (BRITE) ISDN circuit cards. Rather than install a dedicated processor on each BRITE card or multiple BRITE circuits on one card, each BRITE circuit card of the channel bank has no processor of its own, but is instead controlled by a shared control processor on a separate bank controller card. Since each such 'processorless' BRITE circuit card contains only single BRITE circuit, removal of any one BRITE circuit card from its backplane slot will not impair the operational integrity of the other BRITE cards, so that service to customer premises equipment terminating the local loops to such cards is not interrupted. The shared processor on the bank controller card executes the same single task communication control routine for plural BRITE cards.

16 Claims, 4 Drawing Sheets

6,018,529

CHANNEL BANK WITH INDIVIDUALLY REMOVABLE PROCESSORLESS U-BRITE CARDS CONTROLLED BY BANK CONTROLLER CARD

FIELD OF THE INVENTION

The present invention relates in general to communication networks and systems for transporting digital telecommunication signals, and is particularly directed to a new and improved integrated services digital network (ISDN) channel bank architecture, that contains a plurality of 'processorless' U-Basic Rate-One Transmission Extension, or U-BR1TE, ISDN circuit cards (also known in the industry as Basic Rate Interface Transmission Extension (U-BRITE) cards), which are removably installed in respective card slots of the channel bank's backplane, with each card being controlled by a common processor that is resident on a separate bank controller card.

BACKGROUND OF THE INVENTION

Integrated services digital network (ISDN) communication systems enable telephone service providers to supply multiple types of signalling channels from a central office to a network termination interface at a customer premises site. An example of a reduced complexity 'extended distance' ISDN communication network architecture is diagrammatically illustrated in FIG. 1, as comprising a PCM communication link (such as a T1 data rate (1.544 Mb/s) optical fiber link) 10, through which a central office (CO) 20 at a 'west' end of the PCM link 10 transmits and receives signalling traffic with respect to a customer premises equipment (CPE) served by a channel bank 30 at a remote or 'east' end of the PCM link 10. The central office 20 includes a central office switch 21 (such as a 5ESS switch manufactured by AT&T), that contains a plurality of line termination circuits (or line cards) 22, each of which is coupled over a local loop (twisted tip/ring pair) to local customer site.

As shown in FIG. 2, in order to provide service to remote customers, the channel bank 30 at the 'east' end of the PCM link 10 terminates the link by way of a line interface unit (LIU) 31, which is coupled over an internal PCM bus 32 to a plurality of U-BRITE circuit cards 33 installed in the channel unit's backplane 34. Each respective U-BRITE circuit card 33 is dedicated to providing extended ISDN service to remote customer premises equipment via a local loop 35 between the U-BRITE circuit 33 card and digital communication equipment 40 installed at a respective customer premises.

A carrier system transceiver within the line interface unit 31 is operative, under control of an attendant communications control processor, to transmit and receive standard 2B+D ISDN data traffic over the PCM digital data link 10. To interface digital subscriber loop (DSL) over the local loop (twisted pair) 35 to the customer premises equipment (CPE) 40, the U-BRITE circuit card 33 includes a line transceiver and an associated line interface, which are also operative, under microprocessor control, to interface PCM data with the line interface unit 31 and to transmit and receive basic rate 2B1Q ISDN signals over the local loop to and from CPE 40.

Because each U-BRITE card's microcontroller (and associated memory) constitutes a substantial portion of the total cost of the U-BRITE card, ISDN equipment vendors have sought ways to simplify the complexity of the U-BRITE circuitry. (The historical reason for each U-BRITE card having its own processor is the fact that channel banks originally did not contain the requisite digital signal processing capability, making it necessary to install a processor on each digital communication card.)

One proposal to eliminate this hardware and cost penalty involves installing a plurality of U-BRITE circuits (e.g., eight such circuits) on a single 'multi' U-BRITE circuit card, and controlling each of the card's U-BRITE circuits by a shared micro-controller installed on the same one card with the multiple U-BRITE circuits. While such a multi-circuit configuration offers a reduction in the number of components (processors) and therefore a cheaper card, it suffers from a major drawback in the event it becomes necessary to remove the card from the channel bank's backplane, for example, for the purpose of maintenance or replacement of an individual U-BRITE circuit. Since a multi-U-BRITE circuit card contains plural U-BRITE circuits, each associated with a respectively different customer, removal of the card will necessarily interrupt service to customers other than just the one connected to the U-BRITE circuit of interest.

SUMMARY OF THE INVENTION

In accordance with the present invention, the desire to reduce the complexity and cost associated with installing a single U-BRITE circuit-dedicated processor on each U-BRITE card, but without suffering from the service interruption penalty associated with the multi-circuit card configuration described above, is successfully addressed by a new and improved ISDN channel bank architecture, that contains a plurality of individually removable, but 'processorless' U-BRITE circuit cards. Each such processorless U-BRITE circuit card has no processor of its own, but is instead controlled by a shared control processor that is resident on a separate bank controller card. Since each 'processorless' U-BRITE circuit card contains only one U-BRITE circuit, removal of the U-BRITE circuit card from its backplane slot will not impair the operational integrity of the other U-BRITE cards, so that service to customer premises equipment terminating the local loops to such cards is not interrupted. The channel bank also contains a standard line interface unit (LIU) card and a power supply/alarm card installed in their own backplane card slots.

A U-BRITE circuit card modified in accordance with the present invention includes a standard backplane (edge) connector through which physical mounting and signalling access with the bus structure of the backplane is provided. A bus transceiver interfaces the backplane bus with input/output ports by way of an intracard signalling bus. A bus control logic unit is coupled to the control bus portion of the backplane and interfaces control signals generated by the shared control processor on the bank controller card with various processor-controlled circuit components of a respective U-BRITE card.

The intracard signalling bus is coupled to U-BRITE signal transmission circuitry, including a PCM DS1 carrier system transceiver and a line transceiver. The DS1 carrier system transceiver interfaces 2B+D ISDN (DS1) data traffic on the backplane's PCM bus with the line interface card. In response to control signals sourced from the shared/common microprocessor on the bank controller card, the line transceiver and its associated subscriber line interface PCM data with the carrier system transceiver and transmit and receive digital subscriber line (DSL) signals (e.g., basic rate ISDN 2B1Q signals) over the local loop to and from digital data terminal equipment at a customer premises.

The modified bank controller card is configured to map each U-BRITE card slot into a prescribed portion of the address space of a RAM associated with the bank controller card's control processor. For this purpose, a selected portion (the upper eight bits) of the address bus for accessing the RAM is connected to the processor's general purpose encoded I/O port, so as to allow software control of an upper or most significant portion of the memory address bus. By controlling the system RAM address lines via the processor's general purpose I/O port, system memory is subdivided into a plurality of respective multi-byte blocks or 'pages', each of which is dedicated to a respective (U-BRITE) card slot (which is mapped into the RAM via the I/O pins). This page-mapping scheme allows control processor to extend operational control of a single U-BRITE card to multiple cards.

Namely, by using the I/O pins to control the upper RAM address space and thereby set a 'page' address, each of the I/O port-mapped physical card slots of the backplane can be controlled by single task software. Such 'multi-tasking' extension of the bank controller's U-BRITE card-controlling signal task software eliminates the burden that would be imposed by installing a standard multitask operating system. As a consequence, the available bandwidth of the processor is more efficiently utilized, which means that a less powerful and therefore less expensive processor may be employed.

The bank controller card includes a bus transceiver that interfaces the backplane bus with an intracard signalling data/address bus. The intracard signalling data/address bus has a prescribed code width, e.g., a sixteen bit wide address portion and an eight bit wide data portion, plus (an eight bit wide) control portion, and is coupled to the control processor, an associated read only memory (ROM) in which a multi U-BRITE card-controlling, supervisory communication program is stored, and RAM. A prescribed number (e.g., eight) of bits of the bus are further coupled to a card slot decoder which is operative to decode a selected number of the most significant or upper address bits into a backplane card slot location. The decoder has a plurality of output lines coupled to respective line drivers of a set of card select line drivers associated with the card enable inputs to the U-BRITE cards.

As pointed out above, a prescribed number of most significant bits of the bank controller card's address/data bus are coupled to the respective bits of the control processor's input/output port of the control processor. A first purpose of these encoded I/O port bits is to designate a respective 'page' of memory in which status information associated with one of the U-BRITE cards is stored. For an address bus width of sixteen bits, and the encoded I/O port bits expropriating the upper eight bit address input to the RAM, the remaining eight bits provide for up to 256 storage locations per page. For a data code resolution of eight bits, each page is therefore capable of storing 256 bytes of data.

A second purpose of the encoded I/O port bits is to identify the actual physical card slot in the backplane, whose 256 byte page address in RAM is identified by the same encoded I/O bits. As a consequence, whenever the control processor uses its general purpose I/O port to point to a respective page in RAM, that same I/O port code will be mapped and translated into an input to that one of a set of card select line drivers associated with the card enable input to the U-BRITE card.

When the processor is initialized at the start of the supervisory U-BRITE card control routine for extending control over the operation of a single U-BRITE card to plural U-BRITE cards installed in the channel bank's backplane, it outputs a code on the I/O port representative of the first page in memory associated with the first U-BRITE card. This I/O pin code is thus mapped into a RAM page address, and the card slot decoder decodes the mapped I/O port-to-page address into a physical card slot location on the backplane.

The card slot associated with the first page address is examined to determine whether a card is actually installed in that card slot. If a card is properly installed, it is then initialized and the processor increments the page (I/O port) address to the next page. On the other hand, if a card is not properly installed in the card slot associated with the page address of interest, the routine increments the page (I/O port) address to the next page. The current page address is then examined to determine whether that page address is larger than the maximum number of cards that may be installed in the backplane. The purpose of this step is to inform the processor when all cards have been initialized. Until all cards have been initialized, the routine repeats the initialization subroutine. Once all cards have been initialized, the routine sets the page address to the first page (and simultaneously points to the card slot for that page).

The supervisory routine for controlling the operation of a single U-BRITE card is then executed. During this single task step, data can be written to and read from various communication circuits of the selected card via the backplane bus. Upon completion of the single card communications operation control routine, the page address is incremented, and a determination is again made as to whether the current page address is larger than the maximum number of cards that may be installed in the backplane. If not, the supervisory routine for controlling the operation of a single U-BRITE card is executed for the next card/page address. When the single card communications operation control routine has been executed on each initialized U-BRITE card, the page address is reset to the first page, and the control routine is thereafter repeatedly looped through all cards in the backplane. In this manner the single card control routine runs in a continuous loop through each U-BRITE card, so that each installed and operative U-BRITE card will be repeatedly serviced by the same control routine executed by the back controller's processor.

Since each U-BRITE circuit has its own card slot, should it become necessary to remove a U-BRITE card, that removal will not affect the other cards of the backplane, so that the processor can continue controlling the operation of the other U-BRITE cards in the channel bank. As is customary practice, an internal error message will be generated for any previously initialized card. That error message has no impact on the ability of the processor to continue using the same single card routine to step through and control the operation of the remaining U-BRITE cards.

DETAILED DESCRIPTION

Figure 1:
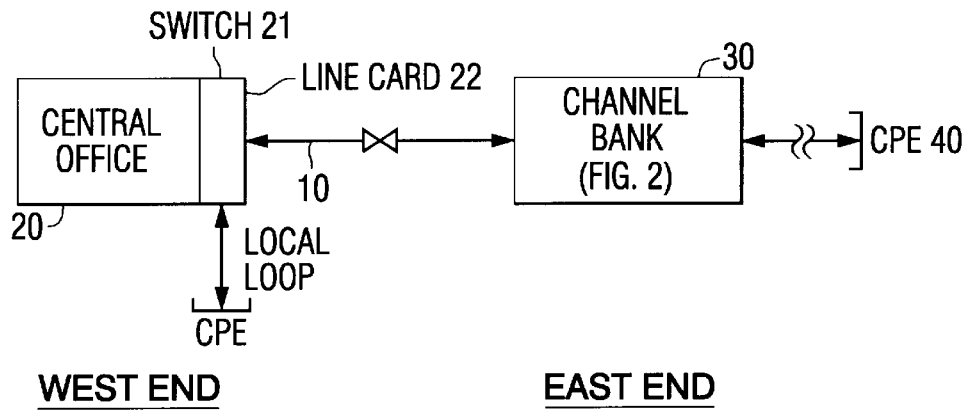
FIG. 1 diagrammatically illustrates an example of a reduced complexity 'extended distance' ISDN communication network architecture.
Figure 2:
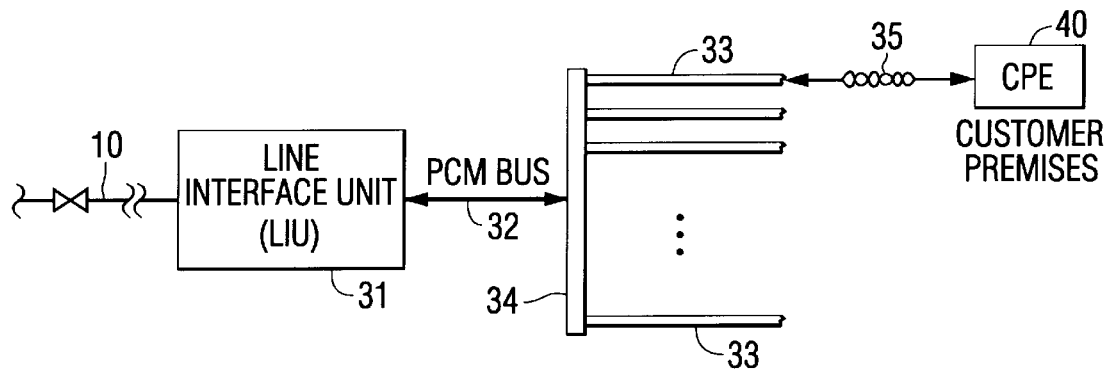
FIG. 2 shows the configuration of a conventional U-BRITE circuit card of the type employed in the extended distance ISDN communication network architecture of FIG. 1.

Before describing in detail the new and improved 'processorless' configured U-BRITE card-based ISDN channel bank architecture in accordance with the present invention, it should be observed that the invention resides primarily in what is effectively a prescribed arrangement of conventional digital communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 3:
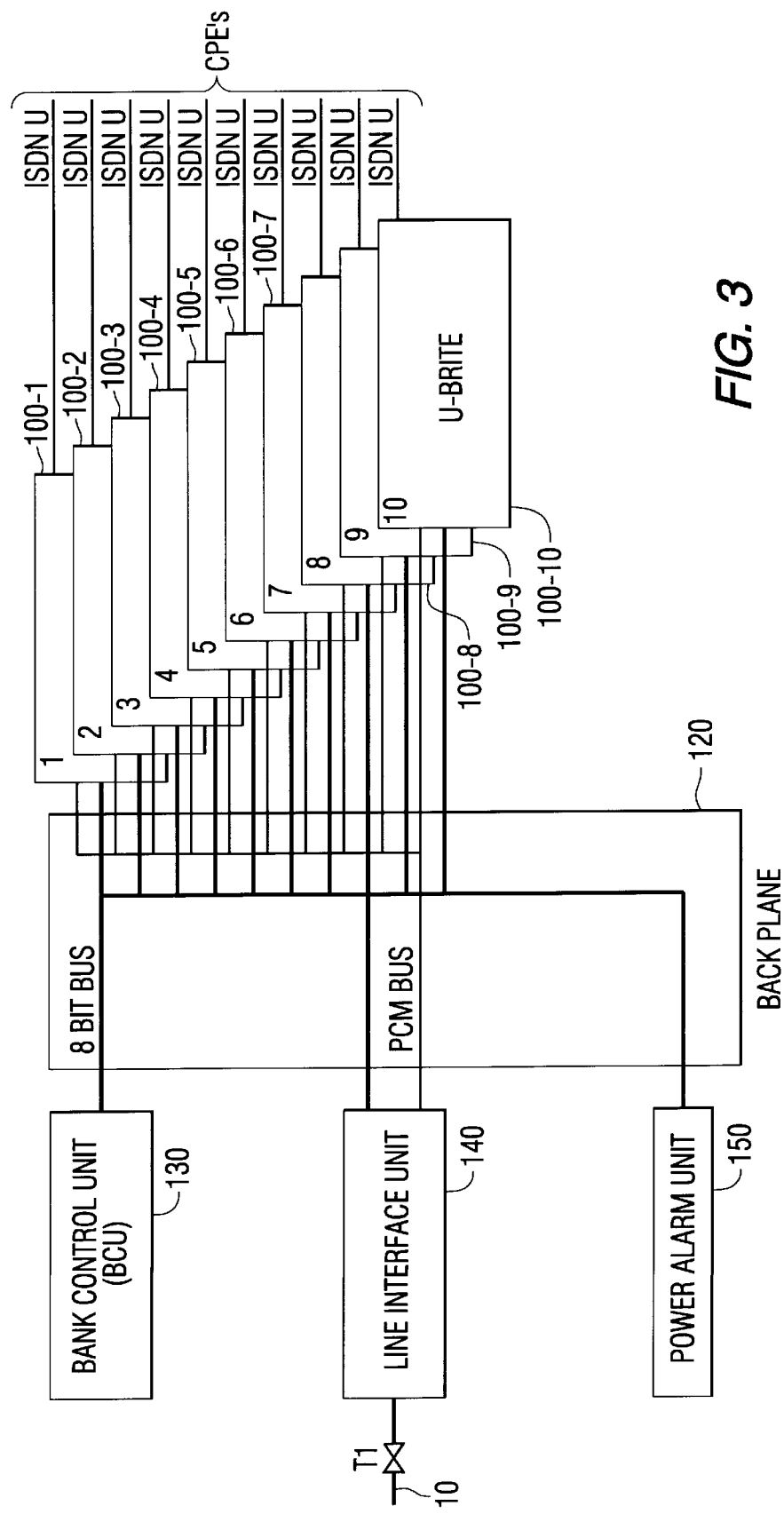
FIG. 3 diagrammatically illustrates the architecture of a channel bank containing a plurality of individually removable, and processorless U-BRITE cards that are controlled by means of a single task software routine executed by a separate bank controller card in accordance with the present invention.
Figure 4:
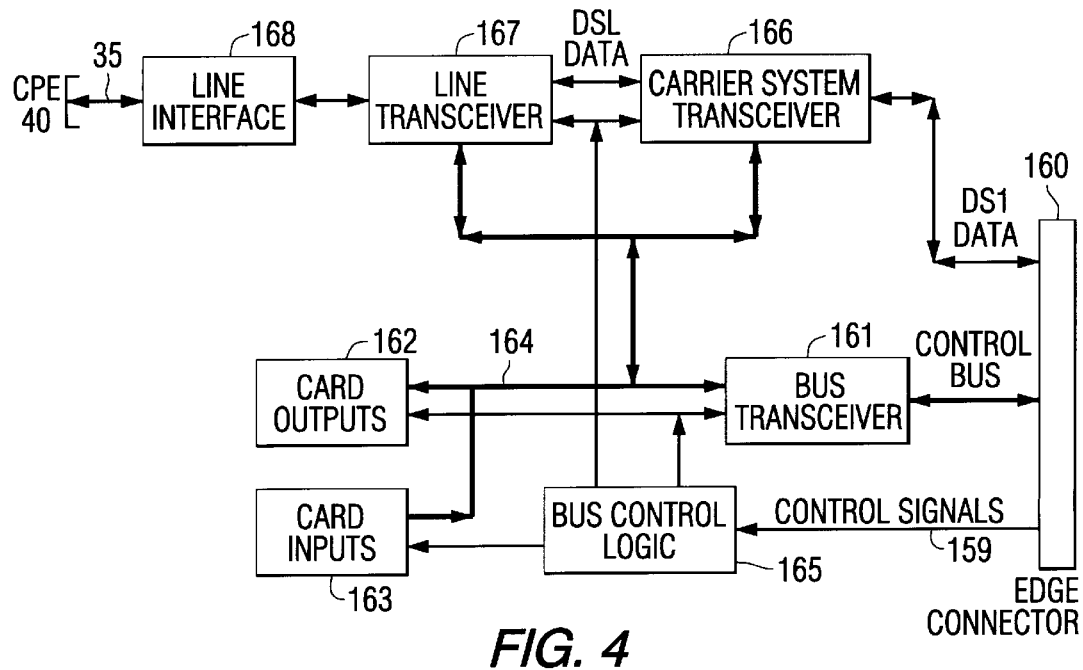
FIG. 4 diagrammatically illustrates the architecture of a modified U-BRITE circuit card in accordance with the present invention.

Referring now to FIG. 3, an embodiment of the ISDN channel bank architecture in accordance with the present invention is diagrammatically illustrated as comprising a plurality of 'processorless' U-BRITE circuit cards 100 (a respective one of which is shown in detail in FIG. 4, to be described). Each U-BRITE card 100 is installed in its own respective card slot in a channel bank backplane 120. As pointed out briefly above, by 'processorless' is meant that the U-BRITE card 100, per se, contains no processor of its own. Instead, each processorless U-BRITE card is controlled by, or 'shares', the processing capability of a common micro-controller of the bank controller unit on a bank controller card 130, which is installed in its own card slot of the channel bank backplane 120. As a non-limiting example, FIG. 3 shows ten U-BRITE cards 100-1, . . . , 100-10 installed in respective card slots of the backplane 120. It is to be understood that the number of U-BRITE cards that may be so installed in the channel bank backplane and controlled by a common microcontroller installed in the backplane is not limited to this or any other number.

The channel bank also contains a standard line interface unit (LIU) card 140 and a power supply and alarm card 150, which are installed in their own respective backplane card slots of the backplane 120. Since each of the line interface unit (LIU) card 140 and a power supply and alarm card 150 is of conventional circuit construction, they will not be described in detail here. Also, except for modifications imparted by the present invention, each of the U-BRITE card 100 and bank controller card 130 is of conventional circuit construction. The circuit architectures of U-BRITE card 100 and bank controller card 130 will be described in detail below with reference to FIGS. 4 and 5.

More particularly, the architecture of a modified U-BRITE circuit card in accordance with the present invention is diagrammatically illustrated in FIG. 4 as comprising a standard backplane (edge) connector 160, through which physical mounting and signalling access with the bus structure of the channel bank's backplane is provided. A bus transceiver 161 interfaces the backplane bus with input/output ports, shown at 162 and 163, by way of an intracard signalling bus 164. Also coupled to the control bus 159 portion of the backplane is a bus control logic unit 165, which interfaces control signals generated by a control processor resident on the bank controller card 130, with various processor-controlled circuit components of the U-BRITE card, as will be described.

The intracard signalling bus 164 is further coupled to U-BRITE signal transmission circuitry, including a PCM DS1 carrier system transceiver 166 and a line transceiver 167. Carrier system transceiver 166 interfaces 2B+D ISDN (DS1) data traffic over the backplane's PCM bus with the line interface card 140. Line transceiver 167 is coupled through a subscriber line interface 168 to the twisted pair of a local loop 35 to the customer premises equipment 40. In response to control signals sourced from the shared/common microprocessor resident upon the bank controller card 130, line transceiver 167 and its associated subscriber line interface 168 are operative to interface PCM data with the carrier system transceiver 166 and to transmit and receive digital subscriber line (DSL) signals (e.g., basic rate ISDN 2B1Q signals) over the local loop 41 to and from digital data terminal equipment at the customer premises.

It will readily be appreciated that the processorless U-BRITE circuit card of FIG. 4 differs from a conventional U-BRITE card by the absence of dedicated microcontroller (and associated memory) chips and, in lieu thereof, interfaces the control signal lines, that would otherwise be coupled with the card's own microcontroller, with the backplane's address, data and control bus structure, which is interfaced with control processor circuitry installed on the bank controller card 130, to be described. This modified U-BRITE architecture enables the communication components of the U-BRITE card 100 to be controlled by the channel bank controller card's processor, so that, in effect, U-BRITE supervisory control is 'intercard'-sourced, rather than 'intracard'-sourced.

Figure 5:
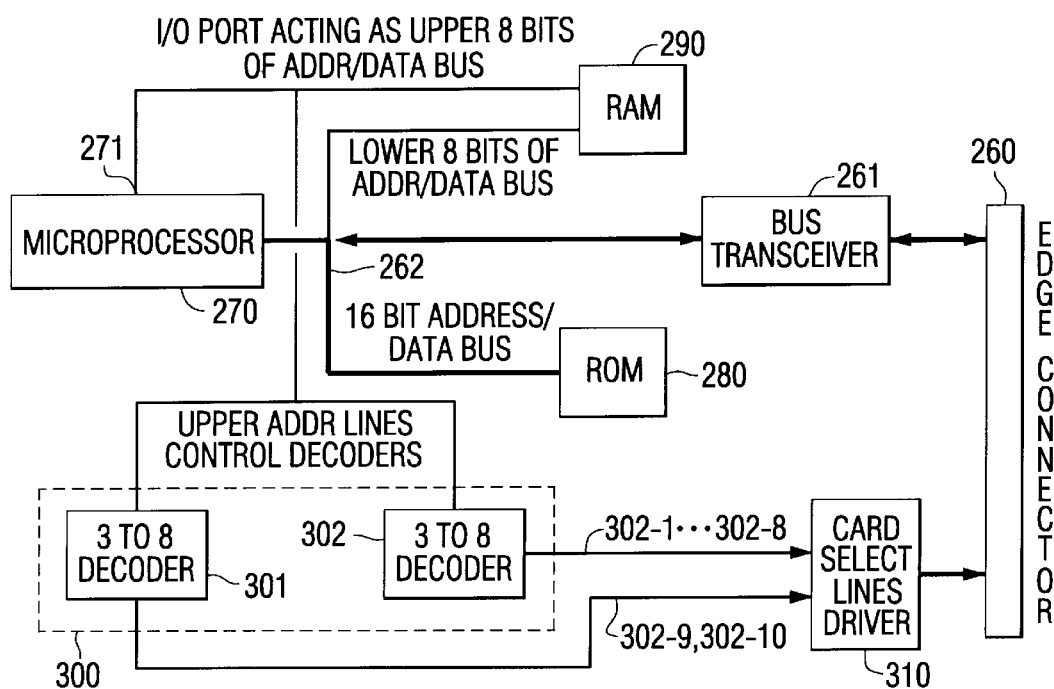
FIG. 5 diagrammatically illustrates the architecture of a modified channel bank control card in accordance with the present invention.

FIG. 5 diagrammatically illustrates the architecture of a modified bank controller card that is configured to control a plurality of the processorless U-BRITE cards of FIG. 4, described above. For this purpose, the modified bank controller card architecture of FIG. 5 is configured to map each card slot in the channel bank 120 into a prescribed portion of the address space of a RAM 290 associated with a control processor 270. A selected portion (the upper eight bits) of the address bus for accessing the RAM 290 is connected to the processor's general purpose encoded I/O port 271, so as to allow software control of an upper or most significant portion of the memory address bus.

As will be described, by controlling the system RAM address lines via the processor's general purpose I/O port 271, system memory (RAM 290) is subdivided into a plurality of respective multi-byte blocks or 'pages', each of which is dedicated to a respective (U-BRITE) card slot (which is mapped into the RAM via the I/O pins). This page-mapping scheme allows control processor 270 to extend operational control of a single U-BRITE card 100-i, to multiple cards. Namely, by using the I/O pins 271 to control the upper address space of the RAM 290 and thereby set a 'page' address, each of the I/O port-mapped physical card slots of the backplane can be controlled by single task software. This 'multi-tasking' extension of the bank controller's U-BRITE card-controlling signal task software eliminates the burden that would be imposed by installing a standard multitask operating system. As a consequence, the available bandwidth of the processor is more efficiently utilized, which means that a less powerful and therefore less expensive processor may be employed.

More particularly, via a backplane (edge) connector 260, through which physical mounting and signalling access of the bank controller card with the bus structure of the channel bank's backplane 120 is provided, a bus transceiver 261 interfaces the backplane bus with an intracard signalling data/address bus 262. Intracard signalling data/address bus 262 has a prescribed code width, e.g., a sixteen bit wide address portion and an eight bit wide data portion, plus (an eight bit wide) control portion. Bus 262 is coupled to each of control processor 270, an associated read only memory (ROM) 280, in which a multi U-BRITE card-controlling, supervisory communication program (to be described with reference the flow diagram of FIG. 6) is stored, and RAM 290.

Also coupled to the prescribed number (e.g., eight) of bits of bus 262 is a card slot decoder 300, which is operative to decode a selected number of the most significant or upper address bits into a backplane card slot location. For the non-limiting example of the bank controller card 130 being used to control the operation of ten U-BRITE cards 100-1, ..., 100-10, described above, card slot decoder 300 may be readily implemented by means of a pair of three-to-eight decoder chips 301, 302, which provide a total input bit width of six bits—which is sufficient to provide the four bits necessary to define a total of ten U-BRITE card slot locations. In the present example of ten U-BRITE card slots, card slot decoder 300 has ten output lines 302-1, ..., 302-10, which are coupled to respective line drivers of a set of (ten) card select line drivers 310 associated with the card enable inputs to the U-BRITE cards 100.

As pointed out above, a prescribed number of upper or most significant bits (e.g., the upper eight bits) of address/data bus 262, rather than being coupled to the corresponding (upper eight) bits of the address/data bits of the microprocessor 270, are coupled to the respective bits of the input/output port 271 of control processor 270. These encoded I/O port bits are employed for two purposes.

The first is to designate a respective 'page' of memory (RAM 290), in which status information associated with one of the U-BRITE cards 100 is stored. For the current example of an address bus width of sixteen bits, since the encoded I/O port bits 271 usurp its upper eight bit address input to RAM 290, the remaining eight bits provide for up to 256 storage locations per page. For a data code resolution of eight bits, as a non-limiting example, each of the 256 pages of the present example is therefore capable of storing 256 bytes of data, which is more than sufficient for monitoring and control of the operation of the transceiver components of a respective U-BRITE card 100-i.

The second purpose of the encoded I/O port bits is to identify the actual physical card slot in the backplane, which contains that U-BRITE circuit card 100-i, whose 256 byte page address in RAM 290 is identified by the same encoded I/O bits. Namely, as will be described, whenever the control processor 270 uses its general purpose I/O port 271 to point to a respective page in RAM 290, card slot decoder 300 translates the same I/O port code into an input to that one of a set of card select line drivers 310 associated with the card enable input to the U-BRITE card 100-i.

Figure 6:
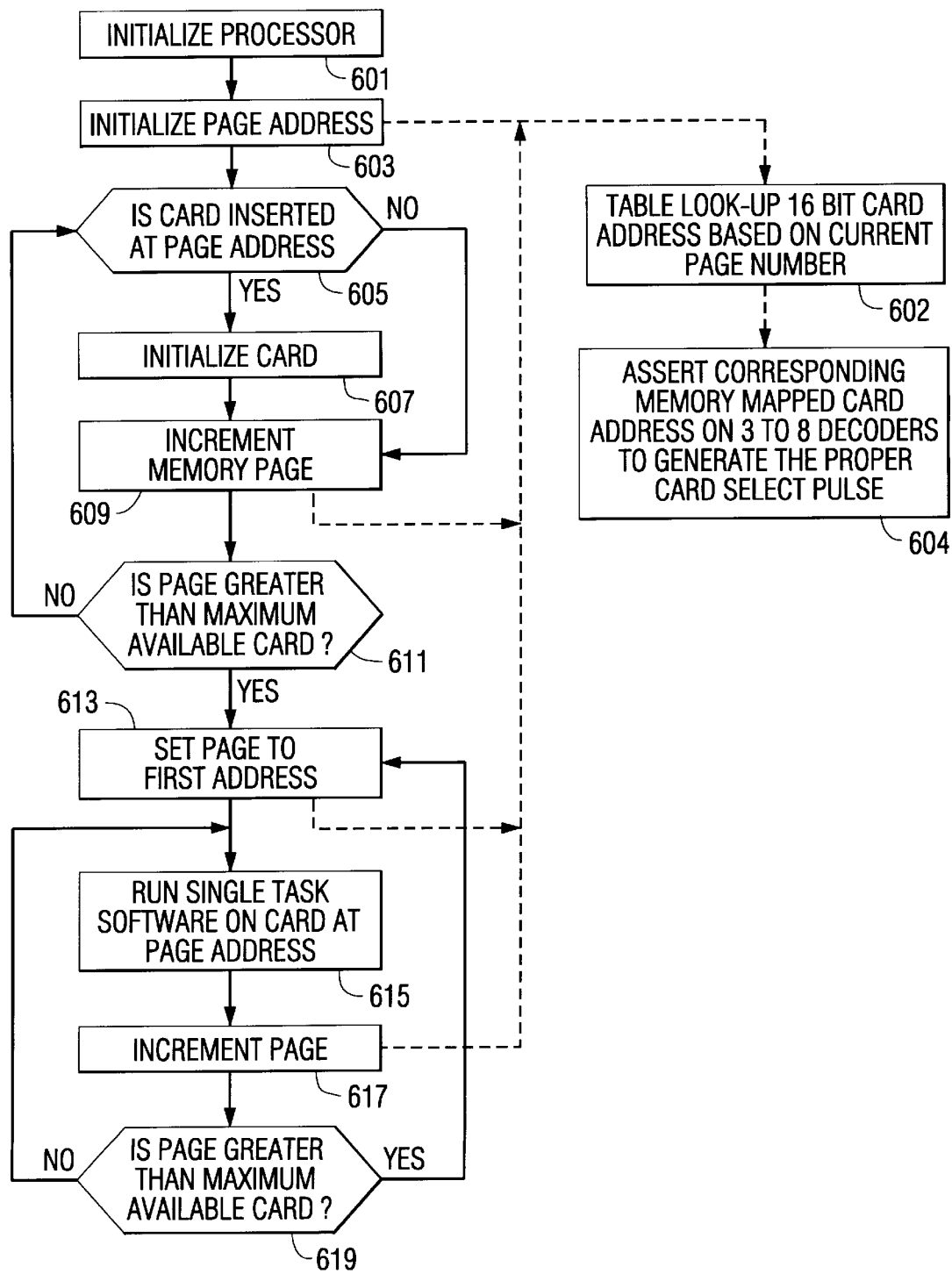
FIG. 6 shows the software flow executed by the bank controller card's microprocessor for extending its supervisory routine for controlling the operation of a single U-BRITE card to each of a plurality of such U-BRITE cards that have been installed in the channel bank's backplane.

FIG. 6 shows the software flow that is stored in ROM 280 and executed by processor 270 for extending its supervisory routine for controlling the operation of a single U-BRITE card to each of a plurality of such U-BRITE cards that have been installed in the channel bank's backplane. At the start of the process, when the processor 270 is booted up (initialized) at step 601, it outputs a code on (resets to zero) the eight bit I/O port 271 representative of the first page in memory (RAM 270), which is associated with the first U-BRITE card being controlled, as shown at step 603. The mapping of this I/O pin code into a RAM page address is shown by step 602, while the associated decoding of the mapped I/O port-to-page address into a physical card slot location on the backplane 120 is shown at step 604.

Next, at query step 605, the card slot associated with the first page address, as determined by card slot decoder 300, is examined to determine whether a card is actually installed in that card slot. This is customarily determined in a conventional manner, for example, by attempting to examine a predetermined component on an installed card, to determine whether a prescribed logic level voltage is present. If a (U-BRITE) card is properly installed, it is then initialized in step 607, and the routine proceeds to step 609, wherein the processor increments the page (I/O port) address to the next page. On the other hand, if the answer to query step 605 is NO (a card is not properly installed in the card slot associated with the page address of interest), the routine by-passes step 607 and proceeds directly to step 609, to increment the page (I/O port) address to the next page.

At query step 611, the current page address is examined to determine whether that page address is larger than the maximum number of cards that may be installed in the backplane. The purpose of this step is to inform the processor when all cards have been initialized. If the answer to query step 611 is NO (not all cards have been initialized), the routine loops back to query step 605. Eventually, when all cards have been initialized, the routine proceeds to step 613, which sets the page address to the first page (and simultaneously points to the card slot for that page).

The supervisory routine for controlling the operation of a single U-BRITE card is then executed in step 615. During this single task step, data can be written to and read from various communication circuits of the selected card via the backplane bus. Upon completion of the single card communications operation control routine carried out in step 615, the processor increments the page address (via I/O port 271) in step 617, and proceeds to query step 619. In query step 619, like step 611, a determination is again made as to whether the current page address is larger than the maximum number of cards that may be installed in the backplane. If the answer to query step 619 is NO (the supervisory routine for controlling the operation of a single U-BRITE card has not been executed for all U-BRITE cards), the routine loops back to query step 615. Eventually, when the single card communications operation control routine of step 615 has been executed on each initialized U-BRITE card (the answer to query step 619 is YES), the process loops back to step 613, which resets the page address to the first page, and simultaneously points to its associated card slot in the backplane. In this manner the single card control routine runs in a continuous loop through each U-BRITE card, so that each installed and operative U-BRITE card 100 will be repeatedly serviced by the same processor 270.

Should a U-BRITE card be taken out of service, its removal will not affect the other cards of the backplane, since each U-BRITE circuit has its own card slot, thereby allowing the processor to continue to control the operation of the other U-BRITE cards in the channel bank. As is customary practice, an internal error message will be generated for any previously initialized card; however, that error message has no impact on the ability of the processor to continue using the same single card routine to step through and control the operation of the remaining U-BRITE cards.

As will be appreciated from the foregoing description, the ISDN channel bank architecture of the present invention reduces the complexity and cost associated with installing a single U-BRITE circuit-dedicated processor on each U-BRITE card, but without the service interruption penalty associated with the multi-circuit card configuration described previously. Rather than installing a dedicated processor on each U-BRITE card or multiple U-BRITE circuits on one card, each U-BRITE circuit card in accordance with the present invention has no processor of its own, but is instead controlled by a shared control processor on a separate bank controller card. Since each 'processorless' U-BRITE circuit card contains only one U-BRITE circuit, removal of any one U-BRITE circuit card from its backplane slot will not impair the operational integrity of the other U-BRITE cards, so that service to customer premises equipment terminating the local loops to such cards is not interrupted.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A digital communication system channel bank comprising:
   a digital transceiver unit coupled to a first digital communication link, said digital transceiver unit interfacing digital communication signals between said first digital communication link and a backplane of said channel bank;
   a plurality of digital communication circuit cards installed in card slots of said backplane of said channel bank, each respective digital communication circuit card having no communications control processor of its own and being coupled to an associated digital communication circuit servicing a respective subscriber; and
   a channel bank controller card installed in said backplane, separate from said plurality of digital communication circuit cards, said channel bank controller card containing a control processor, which is operative to execute communication control software having exclusive control of the operation of each of said plurality of digital communication circuit cards, and wherein said control processor of said channel bank controller card is configured to map the identification of an input/output port thereof into a respective portion of address space of memory employed by said control processor, said respective portion of address space storing information associated with the operation of said digital communication circuit card, and including a card slot decoder which is operative to identify a respective card slot containing said digital communication circuit card in accordance with the identification of said input/output port.

2. A digital communication system channel bank according to claim 1, wherein each respective digital communication circuit card is coupled to interface integrated services digital network (ISDN) signals with an associated digital communication circuit servicing a respective subscriber.

3. A digital communication system channel bank according to claim 1, wherein said first digital communication link comprises a T1 rate digital communication link, and wherein a respective one of said plurality of digital communication circuit cards installed in said backplane of said channel bank is operative, under control of said control processor of said channel bank controller, to execute basic rate interface transmission extension (BRITE) signalling for T1 carrier rate data with an associated digital communication circuit servicing a respective subscriber.

4. A digital communication system channel bank comprising a digital transceiver card installed in a backplane of said channel bank and being coupled to a first digital communication link, said digital transceiver card interfacing digital communication signals between said first digital communication link and said backplane of said channel bank, a plurality of processorless integrated services digital network (ISDN) cards, each of which is removably installed in a respective card slot of said backplane of said channel bank, and is coupled to an associated digital communication circuit servicing a respective subscriber, and a bank controller card installed in another respective card slot of said backplane, and containing a control processor that is shared by said plurality of ISDN cards and is operative to execute a single task communication control software routine for each of said plurality of ISDN cards, and wherein said control processor of said bank controller card is configured to map the identification of an input/output port thereof into a respective portion of address space of memory employed by said control processor, said respective portion of address space storing information associated with the operation of said each ISDN card, and including a card slot decoder which is operative to identify a respective card slot containing said ISDN card in accordance with the identification of said input/output port.

5. A digital communication system channel bank according to claim 4, wherein a respective ISDN card comprises a basic rate interface transmission extension (BRITE) card.

6. A digital communication system channel bank according to claim 4, wherein said control processor is operative to iteratively modify the identification of said input/output port thereof into respectively different portions of said address space of said memory employed by said control processor, said respectively different portions of said address space storing information associated with the operation of respectively different ISDN cards, and wherein said card slot decoder is operative to identify respectively different card slots containing said respectively different ISDN cards in accordance with the modified identification of said input/output port, said control processor executing said single task communication control software routine for said respectively different ISDN cards in accordance with the modified identification of said input/output port.

7. A digital communication system channel bank according to claim 4, wherein said control processor is operative to define the logic states of pins of an input/output port, which defines an upper portion of the address of a page of memory storing information relating to the operation of a respective BRITE card, and an associated backplane card slot in which a respective ISDN card is installed, so that respectively different I/O port-mapped BRITE card slots of the backplane are controlled by single task software executed by said control processor, thereby effecting multi-tasking extension of said bank controller card's ISDN card-controlling single task software.

8. A digital communication system channel bank according to claim 7, wherein said bank controller card includes a bus transceiver that interfaces a backplane communication bus with an intracard signalling data/address bus, said intracard signalling data/address bus having a prescribed code width, and being coupled to said control processor, and said memory, and wherein a prescribed number of bits of said intracard signalling data/address bus are coupled to said card slot decoder which is operative to decode a selected number of the most significant address bits into a backplane card slot location of a respective ISDN card.

9. A basic rate interface transmission extension (BRITE) integrated services digital network (ISDN) card, which has no communications control processor of its own and is removably installable in a respective card slot of the backplane of a digital communication system channel bank, said channel bank including a digital transceiver coupled to a digital communication link and being operative to interface digital communication signals between said digital communication link and said backplane of said channel bank, said channel bank further including a channel bank controller containing a control processor that is programmed to execute a single task communication control software routine for each of a plurality of BRITE ISDN cards, said BRITE ISDN card comprising a PCM digital subscriber loop (DSL) carrier system transceiver, which is operative to interface ISDN DSL data traffic over a PCM bus of said channel bank backplane with said digital transceiver, and a subscriber line interface unit coupled with said carrier system transceiver and being operative to interface PCM data with said carrier system transceiver and to transmit and receive DSL signals over a local loop to and from digital data terminal equipment at a customer premises, in response to control signals sourced from said control processor of said bank controller, and further including a backplane bus transceiver which interfaces a backplane bus with input/output ports by way of an intracard signalling bus, and a bus control logic unit coupled to a control bus portion of said backplane, said bus control logic unit being operative to interface control signals generated by said control processor on said bank controller card with said carrier system transceiver and said subscriber line interface.

10. A BRITE ISDN card according to claim 9, wherein said control processor of said bank controller card is configured to associate a respective portion of address space of a memory, which stores information relating to the operation of said BRITE card, with a backplane card slot containing said BRITE card.

11. A basic rate interface transmission extension (BRITE) integrated services digital network (ISDN) card, which has no communications control processor of its own and is removably installable in a respective card slot of the backplane of a digital communication system channel bank, said channel bank including a digital transceiver coupled to a digital communication link and being operative to interface digital communication signals between said digital communication link and said backplane of said channel bank, said channel bank further including a channel bank controller containing a control processor that is programmed to execute a single task communication control software routine for each of a plurality of BRITE ISDN cards, said BRITE ISDN card comprising a PCM digital subscriber loop (DSL) carrier system transceiver, which is operative to interface ISDN DSL data traffic over a PCM bus of said channel bank backplane with said digital transceiver, and a subscriber line interface unit coupled with said carrier system transceiver and being operative to interface PCM data with said carrier system transceiver and to transmit and receive DSL signals over a local loop to and from digital data terminal equipment at a customer premises, in response to control signals sourced from said control processor of said bank controller, and wherein said control processor of said bank controller card is configured to map the identification of an input/output port thereof into a respective portion of address space of memory employed by said control processor, said respective portion of address space storing information associated with the operation of said BRITE card, and including a card slot decoder which is operative to identify a respective card slot containing said BRITE card in accordance with the identification of said input/output port.

12. A BRITE ISDN card according to claim 11, wherein said control processor is operative to iteratively modify the identification of said input/output port thereof into respectively different portions of said address space of said memory employed by said control processor, said respectively different portions of said address space storing information associated with the operation of respectively different BRITE cards, and wherein said card slot decoder is operative to identify respectively different card slots containing respectively different BRITE cards in accordance with the modified identification of said input/output port, said control processor executing said single task communication control software routine for said respectively different BRITE cards in accordance with the modified identification of said input/output port.

13. A BRITE ISDN card according to claim 11, wherein said bank controller card includes a bus transceiver that interfaces a backplane communication bus with an intracard signalling data/address bus, said intracard signalling data/address bus having a prescribed code width, and being coupled to said control processor, and said memory, and wherein a prescribed number of bits of said intracard signalling data/address bus are coupled to said card slot decoder which is operative to decode a selected number of the most significant address bits into a backplane card slot location of said BRITE card.

14. A method of providing integrated services digital network communications between a central office and customer premises equipment, comprising the steps of:

(a) installing a digital transceiver card in a backplane of a digital communication system channel bank, said digital transceiver card being coupled to a first digital communication link with said central office and interfacing digital communication signals between said first digital communication link and said backplane of said channel bank;

(b) installing a plurality of processorless, basic rate interface transmission extension (BRITE) integrated services digital network (ISDN) cards in respective card slots of said backplane of said channel bank, each processorless BRITE card being coupled to an associated digital communication circuit servicing a respective subscriber;

(c) installing a bank controller card in another respective card slot of said backplane, said bank controller card containing a control processor that is shared by said plurality of processorless BRITE cards; and (d) causing said control processor of said bank controller card to execute the same single task communication control routine for each of said plurality of processorless BRITE cards by causing said processor to output respective digital codes on an input/output (I/O) port thereof representative of addresses of respective different pages of memory associated with said plurality of BRITE cards, said pages storing information relating to the operation of said plurality of BRITE cards, and decoding said respective digital codes into identifications of physical card slots in which said plurality of BRITE cards are installed in said backplane.

15. A method of configuring a channel bank for providing integrated services digital network (ISDN) communications between a central office and customer premises equipment, comprising the steps of:

(a) installing a digital transceiver card in a backplane of said channel bank, said digital transceiver card being coupled to a first digital communication link with said central office, so as to enable ISDN communication signals to be interfaced between said first digital communication link and said backplane of said channel bank;

(b) installing a plurality of basic rate interface transmission extension (BRITE) integrated services digital network (ISDN) cards in respective card slots of said backplane of said channel bank, each BRITE card being exclusive of a control processor therefor and being coupled to an associated digital communication circuit servicing a respective subscriber; and (c) installing a bank controller card in another respective card slot of said backplane, said bank controller card containing a control processor that is operative to execute the same single task communication control routine that controls the operation of each of said plurality of processorless BRITE cards installed in said respective card slots of said backplane of said channel bank by outputting respective digital codes on an input/output (I/O) port thereof representative of addresses of respective different pages of memory associated with said plurality of BRITE cards, said pages storing information relating to the operation of said plurality of BRITE cards, and decoding said digital codes into identifications of physical card slots in which said plurality of BRITE cards are installed in said backplane.

16. A method according to claim 15, wherein said control processor of said bank controller card is operative to iteratively modify the identification of said input/output port thereof into respectively different pages of said memory associated with respectively different BRITE cards, and wherein said bank controller card includes a card slot decoder that is operative to identify respectively different card slots containing respectively different BRITE cards in accordance with modified identification of said input/output port, said control processor executing said single task communication control software routine for said respectively different BRITE cards in accordance with modified identification of said input/output port.

* * * * *